US011093164B2

(12) United States Patent
Hubbard et al.

(10) Patent No.: US 11,093,164 B2
(45) Date of Patent: Aug. 17, 2021

(54) HANDLING BAD BLOCKS GENERATED DURING A BLOCK ERASE OPERATION

(71) Applicant: Micron Technology, Inc., Boise, ID (US)

(72) Inventors: Daniel J. Hubbard, Boise, ID (US); Marc S. Hamilton, Eagle City, ID (US); Kevin R. Brandt, Boise, ID (US); William Akin, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/552,750

(22) Filed: Aug. 27, 2019

(65) Prior Publication Data

US 2021/0064267 A1    Mar. 4, 2021

(51) Int. Cl.
*G06F 12/00* (2006.01)
*G06F 3/06* (2006.01)

(52) U.S. Cl.
CPC .......... *G06F 3/0652* (2013.01); *G06F 3/0619* (2013.01); *G06F 3/0679* (2013.01)

(58) Field of Classification Search
CPC ..... G06F 3/0652; G06F 3/0619; G06F 3/0679
See application file for complete search history.

(56) References Cited

U.S. PATENT DOCUMENTS 5,442,589 A  *  8/1995  Kowalski ............... G06K 19/07
                                                         257/E23.149
5,448,577 A  *  9/1995  Wells ................... G06F 11/1068
                                                         714/767
2002/0036930 A1 * 3/2002 Shibata .................. G11C 16/10
                                                         365/195
2003/0097609 A1 * 5/2003 Harari ................ G11C 16/3459
                                                         714/6.13
2005/0028052 A1 * 2/2005 Roohparvar ....... G11C 29/1201
                                                         714/710
2006/0107127 A1   5/2006 Park et al.
2007/0253252 A1  11/2007 Ha
2008/0008006 A1 * 1/2008 Goda .................. G11C 16/0483
                                                         365/185.18
2009/0172482 A1 * 7/2009 Wang ..................... G11C 29/82
                                                         714/723

(Continued)

OTHER PUBLICATIONS

International Search Report and Written Opinion for International Application No. PCT/US2020/048172, dated Nov. 25, 2020, 12 pages.

*Primary Examiner* — Arvind Talukdar
(74) *Attorney, Agent, or Firm* — Lowenstein Sandler LLP (57) ABSTRACT

A memory component includes multiple fuses, a memory array having a multiple blocks, and control logic operatively coupled with the memory array and the plurality of fuses. The control logic is to receive an erase command associated with the memory array and attempt to erase, in response to receipt of the erase command, a block of the multiple blocks from the memory array. The control logic is further to detect a failure to completely erase the block. The control logic is further to receive a blow fuse command in response to the failure to completely erase the block. The control logic is to blow a fuse, of the multiple fuses, which is coupled with the block, to make the block of the multiple blocks inaccessible to the control logic.

19 Claims, 6 Drawing Sheets

(56) References Cited

U.S. PATENT DOCUMENTS

| | | | |
|---|---|---|---|
| 2010/0023800 A1* | 1/2010 | Harari | G06F 12/0246 714/2 |
| 2011/0157985 A1 | 6/2011 | Sudo | |
| 2015/0138885 A1 | 5/2015 | Iwai et al. | |
| 2016/0232105 A1* | 8/2016 | Goss | H04L 9/3236 |
| 2018/0088823 A1 | 3/2018 | Ramalingam et al. | |

* cited by examiner

HANDLING BAD BLOCKS GENERATED DURING A BLOCK ERASE OPERATION

TECHNICAL FIELD

Embodiments of the disclosure relate generally to memory sub-systems, and more specifically, relate to handling grown bad blocks generated during a block erase operation.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to handling bad blocks generated during a block erase operation. A memory sub-system can be a storage device, a memory module, or a hybrid of a storage device and memory module. Examples of storage devices and memory modules are described below in conjunction with FIG. 1A. In general, a host system can utilize a memory sub-system that includes one or more memory components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consists of one or more planes. For some types of non-volatile memory devices (e.g., NAND devices), each plane consists of a set of physical blocks. For some memory devices, blocks are the smallest area than can be erased. Each block consists of a set of pages. Each page consists of a set of memory cells, which store bits of data. A "bad block" hereinafter refers to a block that is no longer reliable for storing or retrieving data, for example, due to a defect (e.g., manufacturing defect) or due to wear. A "grown bad block" (GBB) refers to a bad block being unreliable due to wear and can be identified based on a threshold, e.g., bit error rates (BER) threshold. The data stored in one or more memory cells of bad blocks may fail to be properly erased during an erase operation due to the damage, defects, normal wear over time of the memory cells. Examples of commands that perform such a block erase operation include a sanitize block erase command and a security erase command to erase stored data from the memory sub-system. In such a situation, the memory sub-system can receive an error code indicating an error in erasing one or more blocks of a memory component included in the memory sub-system. Failure to fully sanitize a memory sub-system carries security risks where an attacker can physically remove the memory component that includes the bad block to directly access the data on the memory component, including any remaining data that could not be fully erased. In one embodiment, the attacker can also use a diagnostic port to try to retrieve such data.

Conventionally, the memory sub-system is to report such an error in fully erasing the memory components to the host system, and is treated as an Annualized Failure Rate (AFR) event. An AFR event means that the memory sub-system is removed from service and possibly disposed of or destroyed. Accordingly, merely receiving an error in performing certain types of erase operations on the memory sub-system can lead to an AFR event, possible loss of the memory sub-system (or memory device that includes the memory sub-system), or risk possible security risks in exposing residual data if the memory sub-system is not destroyed.

Aspects of the present disclosure address the above and other deficiencies by having a memory sub-system that makes the bad blocks physically and/or electrically inaccessible to any agent that attempts to read the bad block at the level of the memory component. Due to the failure of accessing the bad blocks, an error is not sent to the host system and thus any AFR event is avoided.

Making the bad blocks inaccessible at the level of the memory component can be performed in various ways. In one embodiment, multiple fuses are coupled between control logic (e.g., embedded within a local media controller) of the memory component and corresponding blocks within the memory component. In response to detecting failure (e.g., an error) in attempting to erase a block of multiple blocks within the memory component, the memory sub-system can send a blow fuse command to the control logic. The control logic can blow a fuse that is coupled with the block to make the block inaccessible to the memory sub-system, e.g., to the control logic.

In various embodiments, a read-only memory (ROM) block exists within the memory component to store a logical-to-physical address mapping of the of the multiple blocks of the memory component. The control logic can access these mappings to locate the correct block to respond to a read request that includes the logical address. Thus, in another embodiment, the memory sub-system can send an update ROM command to the control logic in response to detecting the failure (e.g., an error) in attempting to erase the block. The control logic can then update, in response to the update ROM command, programming of the ROM block of the memory component to replace mapping information to the block. In one embodiment, the programming remaps the block to a spare empty block of the multiple blocks.

Advantages of the present disclosure include, but are not limited to, the ability of the memory sub-system to fail to access bad blocks in lieu of detecting a failure to completely erase the blocks, which could result in an AFR event. For example, if the memory sub-system sends a read request directed at the block, the control logic can detect that a corresponding fuse has been blown or that a corresponding field in the ROM block has been updated that makes the block physically and/or electrically inaccessible. In one embodiment, the control logic can return an error to the memory sub-system in lieu of any data stored in the block. But, because this is an error about inaccessible data and not incorrectly deleted data (e.g., associated with a bad block), the memory sub-system need not send an associated error to the host system that could result in an AFR event. Thus, the memory sub-system can continue in operation, e.g., not be decommissioned or destroyed.

Figure 1A:
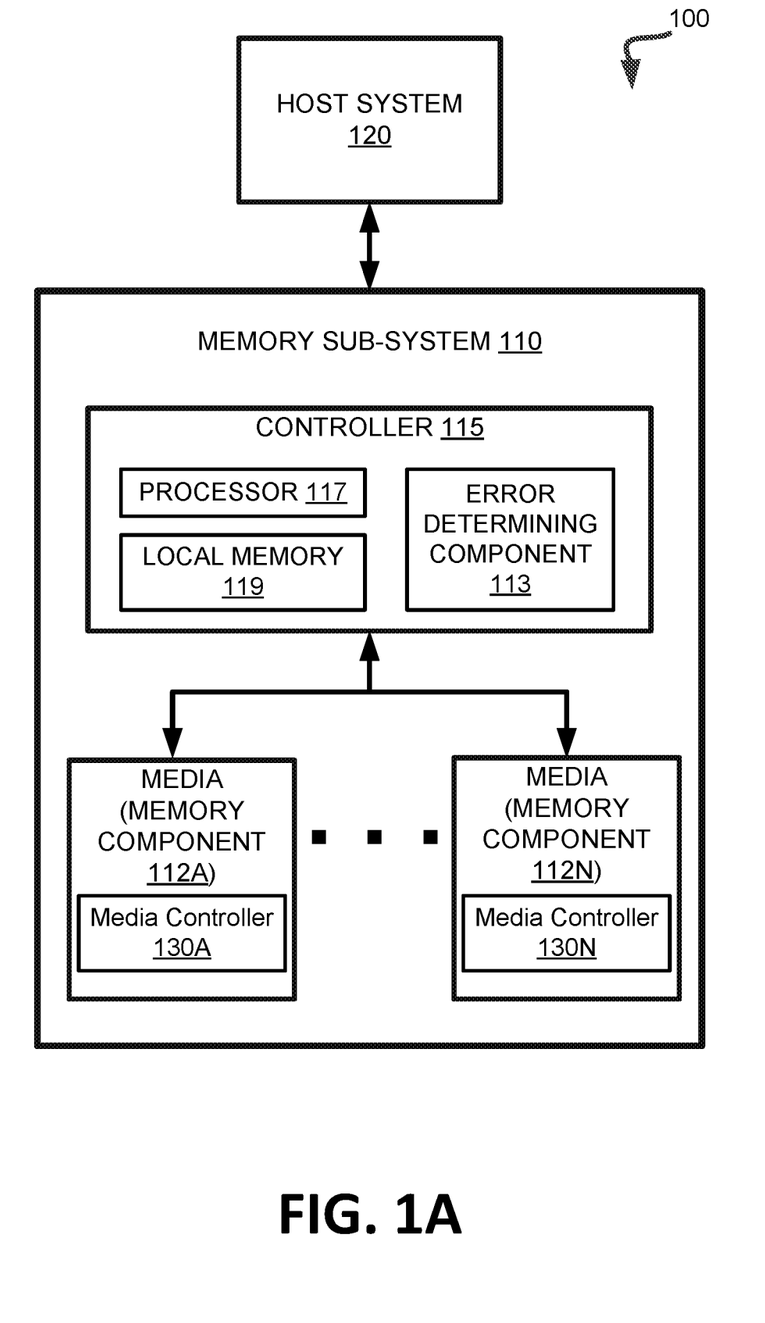
FIG. 1A illustrates an example computing environment that includes a memory sub-system in accordance with some embodiments of the present disclosure.

FIG. 1A illustrates an example computing environment 100 that includes a memory sub-system 110 in accordance with some embodiments of the present disclosure. The memory sub-system 110 can include media, such as memory components 112A to 112N (also hereinafter referred to as "memory devices"). The memory components 112A to 112N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells (e.g., NAND memory cells) such as single level cells (SLCs), multi-level cells (MLCs), triple level cells (TLCs), quad-level cells (QLCs). In some embodiments, a particular memory component can include both an SLC portion and another type (e.g., MLC, TLC, QLC) of portion of memory cells. Each of the memory cells can store one or more bits of data used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped to form pages that can refer to a unit of the memory component used to store data. With some types of memory (e.g., NAND), pages can be grouped to form blocks.

The memory system controller 115 (hereinafter referred to as "memory controller" or just "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 cannot include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical address (e.g., logical block address (LBA)) and a physical address (e.g., physical block address) that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N. Any one of the memory components 112A to 112N can include a media controller (e.g., a media controller 130A and a media controller 130N, respectively) to manage the memory cells of the memory component 112A to 112N, to communicate with the memory sub-system controller 115, and to execute memory requests (e.g., read or write) received from the memory sub-system controller 115.

The memory sub-system 110 includes an error determining component 113 that can be used to detect errors associated with attempted completion of block erase operations and with accessing bad blocks that have been made physically and/or electrically inaccessible. In some embodiments, the controller 115 includes at least a portion of the error determining component 113. For example, the controller 115 can include a processor 117 (processing device) configured to execute instructions stored in local memory 119 for performing the operations described herein. In some embodiments, the error determining component 113 is part of the host system 120, an application, or an operating system.

In some embodiments, the memory components 112A to 112N can be managed memory devices (e.g., managed NAND), which is a raw memory device combined with a local controller (e.g., media controller 130) for memory management within the same memory device package. The media controller 130N can also include the error determining component 113.

The error determining component 113 can receive errors associated with memory components 112A to 112N of the memory sub-system 110, and which errors can be at the granularity of one or more blocks. The error determining component 113 can, in response to sending a block erase command or operation to one of the memory components, detect an error that indicates failure to completely erase at least one block of the multiple blocks on the memory component. The error determining component 113 can then send, to a microcontroller of the memory component, a command to make the block physically and/or electrically inaccessible to the microcontroller in future access requests of the block in one of a number of ways. Further details with regards to the operations of the error determining component 113 are described below.

Figure 1B:
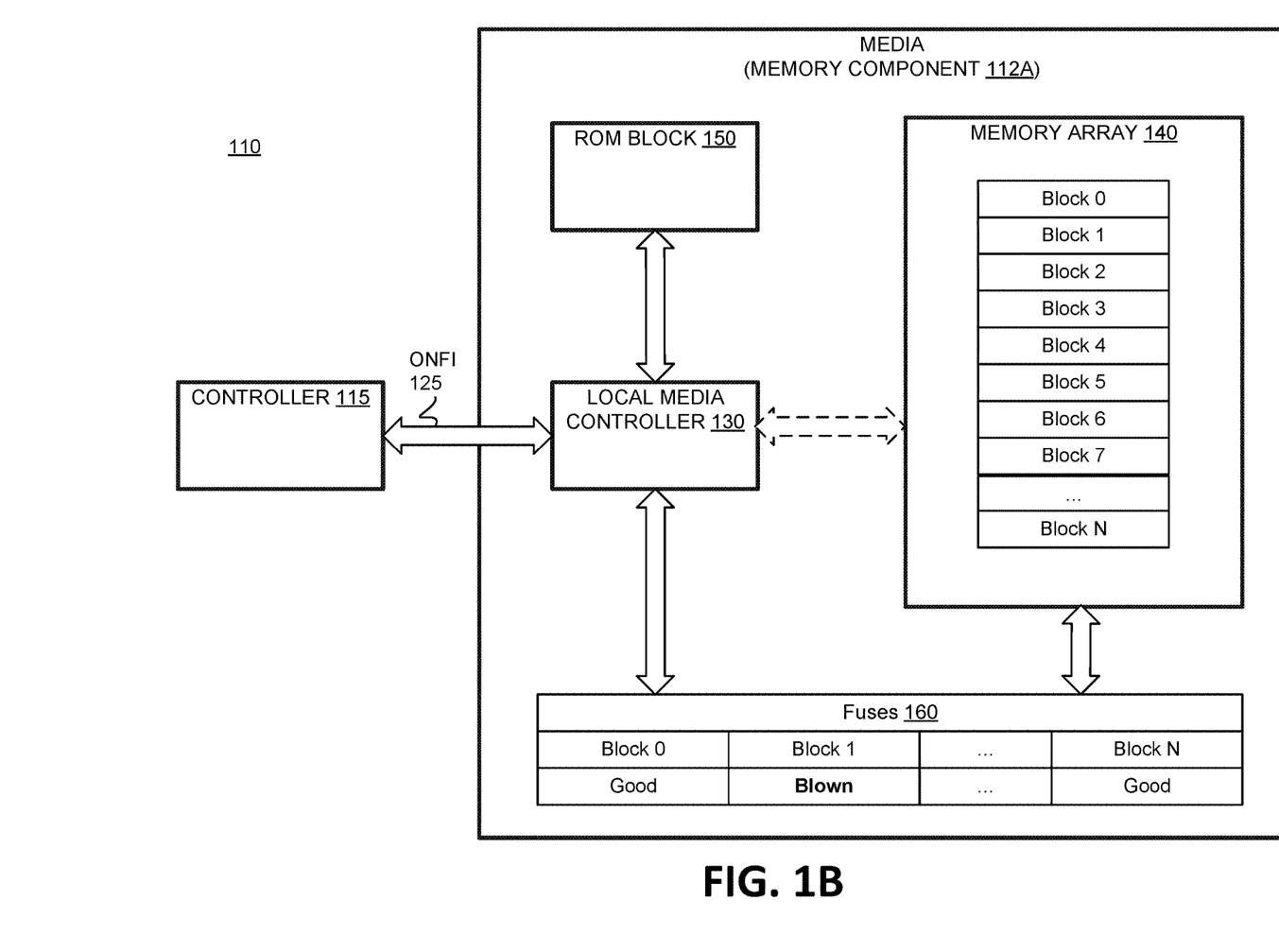
FIG. 1B is a block diagram of the memory sub-system of FIG. 1A in accordance with some embodiments of the present disclosure.

FIG. 1B is a block diagram of the memory sub-system 110 of FIG. 1A in accordance with some embodiments of the present disclosure. In embodiments, the memory sub-system 110 includes the controller 115 coupled to the memory component 112A, which is depicted as exemplary of any of the memory components 112A to 112N. The memory component 112A can include a local media controller 130, a memory array 140, a ROM block 150, and multiple fuses 160. The local media controller 130 can couple the controller 115, the ROM block 150, the memory array 140, and the multiple fuses 160 together as illustrated. In some embodiments, one of the ROM block 150 or the multiple fuses 160 is missing, and thus, the memory component 112A of FIG. 1B illustrates at least two possible embodiments that will be explained. If the ROM block 150 is missing, the dashed arrow can be considered removed, thus forcing access to the memory array 140 to go through the multiple fuses 160.

In one embodiment, the local media controller 130 is coupled to the controller 115 via an open NAND flash interface (ONFI) 125, which is the communication interface between the controller 115 and the memory component 112A when the controller 115 is an SSD controller and the memory component 112A is a NAND component of memory. Further, in some embodiments, the local media controller 130 is a microcontroller that includes a hardware state machine that translates commands from the ONFI interface (as sent by the controller 115) to access the memory array 140. For example, the local media controller 130 can include control logic embodied as the state machine that can be generally unchangeable and that executes the commands or operations as directed by the controller 115. In the present disclosure, the state machine of the local media controller 130 is further adapted to interface with one or both of the ROM block 150 and the multiple fuses 160, which further direct its ability to access certain of the multiple blocks of the memory array 140.

For example, in various embodiments, the memory array 140 is an array of multiple blocks (e.g., numbered zero through N) that can be indexed within the ROM block 150. The ROM block 150 can in turn include a logical-to-physical address mapping of logical addresses (e.g., assigned by the controller 115 or the host system 120) to physical addresses (e.g., an indexed value within the memory array 140). As illustrated, the local media controller 130 can update the mapping for a block (of the multiple blocks) by programming a field of the ROM block 150 with a different value.

In some embodiments, the multiple fuses 160 include a hardware fuse to correspond to each block of the memory array 140. In an embodiment, respective fuses of the multiple fuses 160 are operatively coupled between respective blocks and the local media controller 130. Accordingly, each fuse can be coupled between the local media controller 130 and the memory array 140 such that when a fuse is blown, the data within the block previously coupled to the fuse is both physically and electrically inaccessible to the local media controller 130. The result of this embodiment is to electrically disconnect the block from the local media controller 130. In additional or alternative embodiments, the control logic of the local media controller 130 can be designed to check the status (e.g., fuse state) of a fuse for each block before accessing the data of that block. If the fuse is blown (e.g., as is the fuse for Block 1 in FIG. 1B), the local media controller 130 can block access to the data and return a read error to the controller 115.

Any of the multiple blocks of the memory array 140 can become a bad block upon failure to completely erase its data in response to a block erase command (e.g., a security or sanitize block erase operation). As illustrated in FIG. 1B, the fuse for Block 1 was previously blown in response to failure of a block erase command (e.g., a NAND erase command) during a sanitize block erase operation. More specifically, the local media controller 130 blew the fuse in response to a command sequence, issued through the ONFI 125 by the controller 115, to blow the fuse coupled with Block 1 in response to detecting the failure of the block erase operation at Block 1. When read requests are issued to the memory component 112A in the future, the local media controller 130 can check the fuse state to determine if the target block can be accessed. Future memory accesses to Block 1 can therefore be blocked, preventing generation of a bad block error to the host system 120.

With additional reference to FIG. 1B, the ROM block 150 can be a portion of the memory component that is reserved for system use as ROM in one embodiment. The ROM block 150 can contain a fixed data structure of configuration parameters for NAND device operation in an additional or alternative embodiment. These parameters can include, for example, specification of factory marked "bad" blocks and whether the local media controller 130 is to allow access to the specified block in a mapping within a field of the ROM block. Thus, as illustrated in Table 1, an exemplary logical-to-physical address mapping table, the ROM block 150 can include multiple fields (e.g., mapping fields), each corresponding to a respective block of the multiple blocks of the memory array 140. Note that the "block identifier (ID)" field may not actually be included in the ROM block 150, but is included here for clarity of explanation.

In an additional or alternative embodiments, the local media controller 130 receives an update ROM command (or other command sequence) from the controller 115 in response to the controller 115 detecting an error code or other error that indicates failure to erase a block (e.g., Block 1) of the memory array during a block erase operation. In response to the update ROM command, the local media controller 130 can update the programming of the ROM block 150 to replace mapping information, e.g., a value of the physical address field in one embodiment.

TABLE 1

| Block ID | Logical Address | Physical Address | Factory/Indicator |
|---|---|---|---|
| 0 | MXCA | 0000 | |
| 1 | MXCI | 00001 | Bad (or GBB) |
| 2 | MCXO | 0010 | |
| 3 | NWRT | 0011 | |
| 4 | JQWR | 0100 | |
| 5 | CVGY | 0101 | |
| 6 | NXCA | 00001 | Bad |
| 7 | NXIC | 0111 | |
| ... | KLWE | ... | ... |
| N | ASFD | 1111 | |

In some embodiments, the value of remapping can be to an out-of-bounds value, e.g., by writing a fixed data pattern to a field (e.g., physical address field to Block 1) of the multiple fields. The fixed data pattern (e.g., "00001" or other fixed pattern) can indicate non-access to the block, and therefore block access to the block (e.g., Block 1). In another embodiment, the remapping can be to replace the physical address mapping to remap the logical address to a spare empty block of the multiple blocks. In this case, the local media controller 130 can read the ROM block 150 to determine an unmapped physical address that indicates the corresponding block is empty, and use the physical address value to perform the remapping. The net effect of this remapping is to remap a logical address to a spare empty block of the multiple blocks so that the data in the block (Block 1) is no longer accessible, and a read request would return null or empty data.

In various embodiments, the local media controller 130 is adapted to cause any updates to the programming of the physical address field due to a bad block error to be a one-way update, meaning that any subsequent request(s) to change the physical address field would be masked or rejected by the local media controller 130. This can be enforced by the local media controller 130 checking the fixed bit pattern or reason for the previous update (e.g., in the factory/indicator field) and prevent the subsequent update. In this way, the data associated with a bad block remains inaccessible. Further, a subsequent read request directed at the block can result in detection of the fixed data pattern stored in the field of the ROM block associated with the block. The local media controller 130 can return a read error to the processing device in lieu of any data stored in the block.

Furthermore, in an additional or alternative embodiment, the controller 115 is further to generate a hash-based message authentication code (HMAC) in association with the error code for the block that was received in response to failure of the block erase operation on the block. The HMAC can be generated as a keyed, one-way hash of a combination of the physical address (or an encrypted version of the physical address) and the logical address, for example. The local media controller 130 can further store the HMAC in the physical address field of the ROM as the fixed data pattern or in another field that is also indexed to the block (e.g., Block 1). Use of the HMAC can be an additional or alternative way to prevent system agents from rolling back the ROM block update in attempts to access un-erased data from a failed block erase operation.

Figure 2:
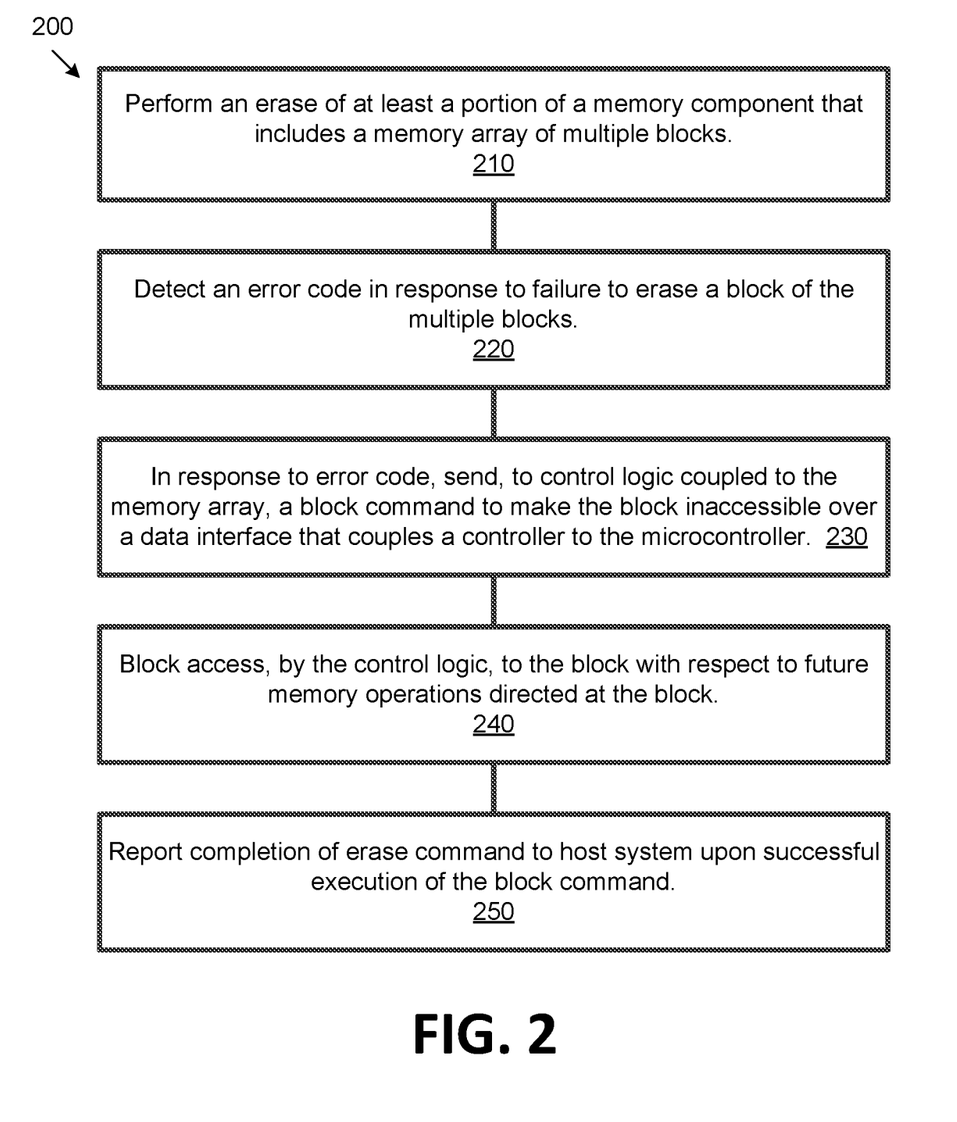
FIG. 2 is a flow diagram of an example method to handle grown bad blocks generated during a block erase operation in accordance with some embodiments of the present disclosure.

FIG. 2 is a flow diagram of an example method 200 to handle grown bad blocks generated during a block erase operation in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the controller 115 (e.g., the error determining component 113) and/or the local media controller 130 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic performs an erase of at least a portion of a memory component that includes a memory array of multiple blocks. As discussed, this erase can be a security or sanitize block erase operation (e.g., initiated as an erase command), as directed by the controller 115 of the memory sub-system 110. At operation 220, the processing logic detects an error code in response to a failure to erase a block of the multiple blocks. For example, control logic of the local media controller 130 can send the error code (or other indicia) to inform the controller 115 of a failure to erase an entirety of the block. The failure to completely erase the block can extend to failure to completely erase additional blocks, but reference is made to the block to simplify the explanation.

With additional reference to FIG. 2, at operation 230, in response to the error code, the processing logics sends, to the control logic that is coupled to the memory array 140, a block command to make the block inaccessible over a data interface that couples the processing device (e.g., the controller 115) to the control logic. This block command (e.g., a second command separate from the erase command) can be one of at least two commands that will be discussed in more detail with reference to FIG. 3 (a blow fuse command) and FIG. 4 (an update ROM command). The blow fuse command can cause the control logic to blow a fuse that couples the controller 115 to the block. The update ROM command can cause the control logic to update programming of the ROM to replace mapping information of a logical address to the physical block, e.g., to map the logical address to an empty block or to program the mapping with a fixed data pattern that indicates non-access to the block.

At operation 240, the processing logic (e.g., the control logic of the local media controller 130) blocks access to the block with respect to future memory operations directed at the block. For example, the control logic can blow the fuse coupled with the block, as discussed with reference to FIG. 3, or update the programming of the ROM block to replace mapping information to the block, as discussed with reference to FIG. 4. At operation 250, the processing logic can report completion of the erase command to the host system 120 upon successful completion of the block command (and completion of any other related block commands associated with different memory blocks that were not completely erased). In this way, the host system 120 can know that the erase command was successfully completed in lieu of receiving a bad block-related error that could otherwise result in an AFR event.

Figure 3:
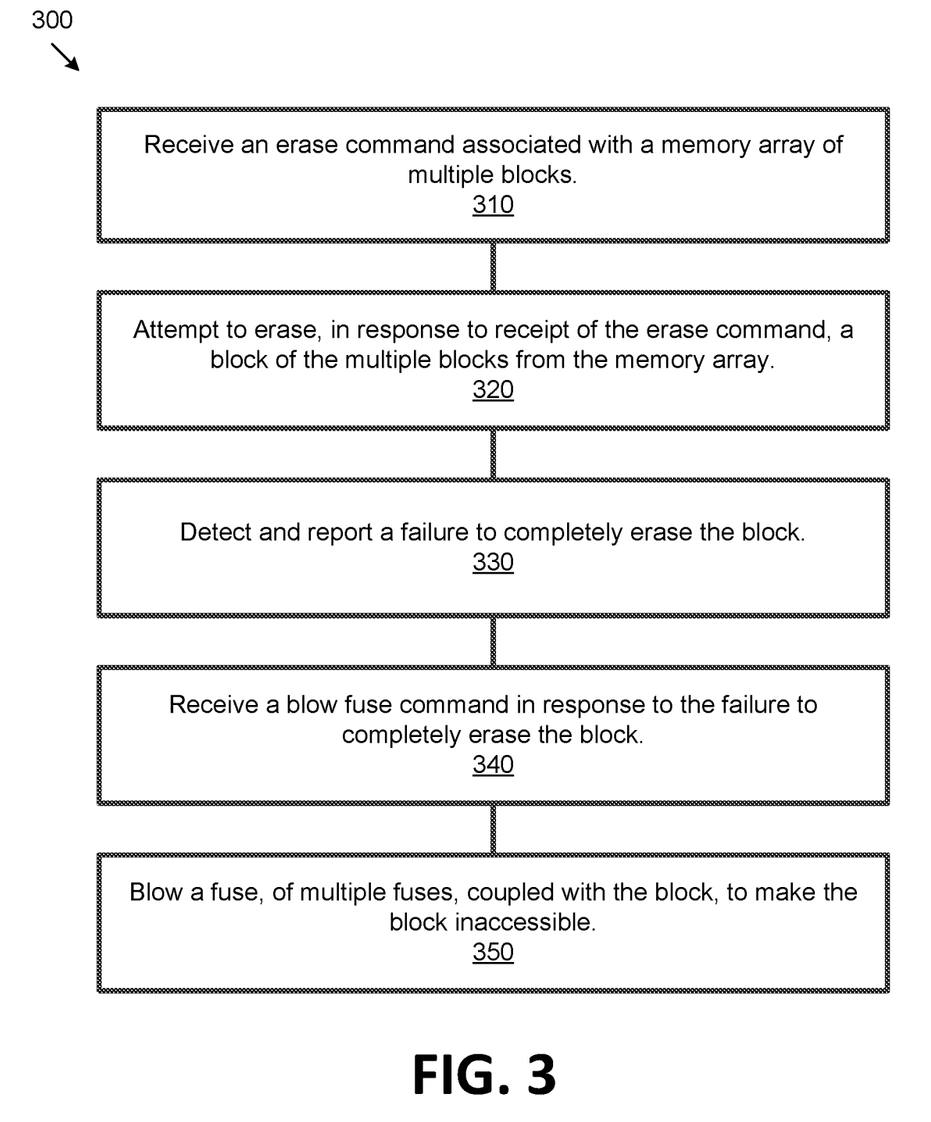
FIG. 3 is a flow diagram of an example method to handle grown bad blocks generated during a block erase operation in accordance with other embodiments of the present disclosure.

FIG. 3 is a flow diagram of an example method 300 to handle grown bad blocks generated during a block erase operation in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the controller 115 (e.g., the error determining component 113) and/or the local media controller 130 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives an erase command associated with a memory array of multiple blocks. As discussed, this erase command can be a security or sanitize block erase operation, as directed by the controller 115. At operation 320, the processing logic attempts to erase, in response to receipt of the erase command, a block of the multiple of blocks from the memory array. If the erase of the block is complete, the local media controller 130 can report a success code to the controller 115 to indicate successful erase of the block. If, however, the erase of the block is incomplete, the local media controller 130 can detect and report an error to the controller 115 such as with an error code or other indication that the erase operation failed. Accordingly, at operation 330, the processing logic can detect and report a failure to completely erase the block, e.g., by way of the error code. The failure to erase the block can extend to failure to completely erase additional blocks, but reference is made to the block to simplify the explanation.

With additional reference to FIG. 3, at operation 340, the processing logic receives a blow fuse command in response to the failure to erase the block. In one embodiment, the controller 115 sends the blow fuse command to the local media controller 130, where the blow fuse command can contain an indication of a particular fuse, e.g., the fuse coupled with Block 1 in FIG. 1B. At operation 350, the processing logic can blow a fuse, of the multiple fuses 160, which is coupled with the block, to the make the block inaccessible, e.g., to the local media controller 130 and thus to the controller 115 as well (or to another coupled device attempting access over the ONFI 125). For example, the control logic of the local media controller 130 can blow the fuse coupled with Block 1 to make the block physically and/or electrically inaccessible to a memory controller, e.g., the controller 115. Any future access attempt to the block (e.g., Block 1) can therefore be blocked by the blown fuse and an error code as to the inaccessibility of the block can be sent from the local media controller 130 to the controller 115.

Figure 4:
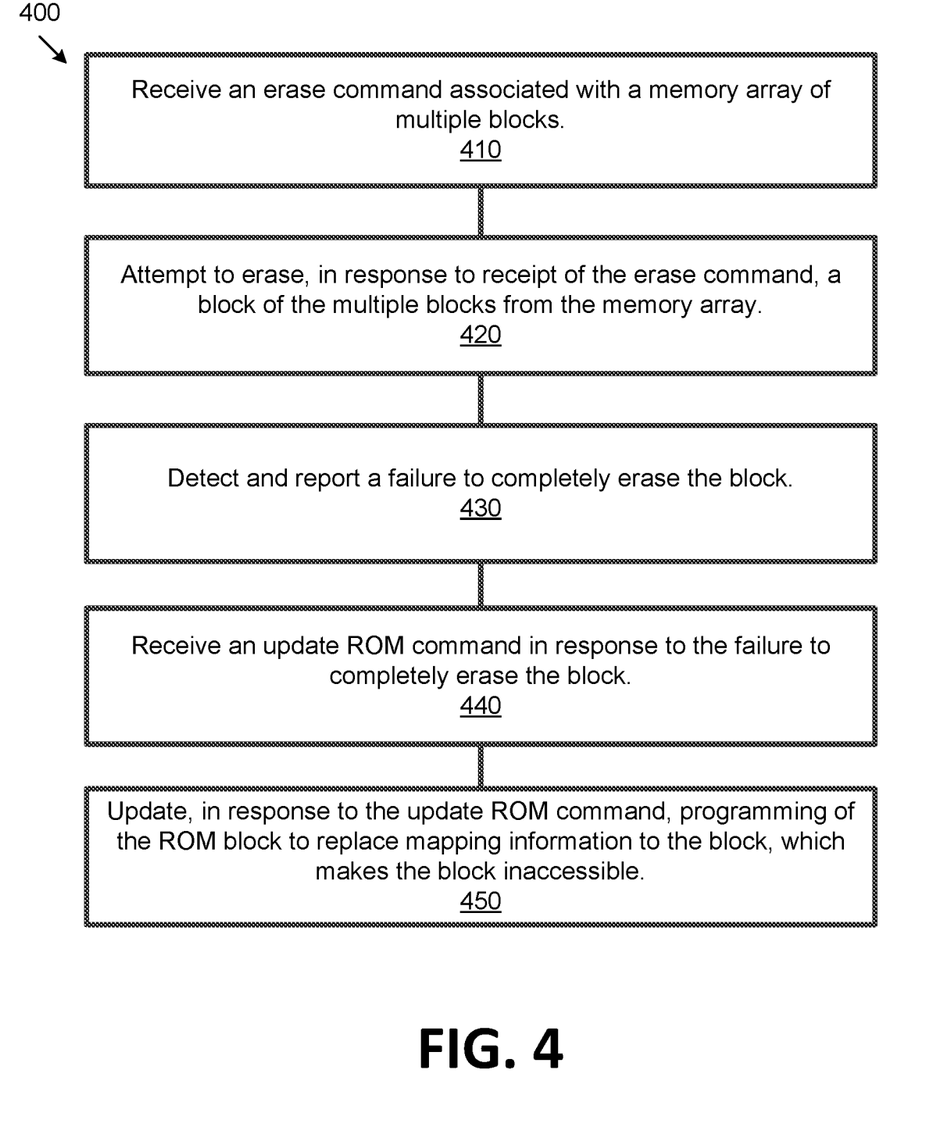
FIG. 4 illustrates an example of determining whether to handle grown bad blocks generated during a block erase operation in accordance with other embodiments of the present disclosure.

FIG. 4 illustrates an example method 400 of determining whether to handle grown bad blocks generated during a block erase operation in accordance with other embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the controller 115 (e.g., the error determining component 113) and/or the local media controller 130 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives an erase command associated with a memory array of multiple blocks. As discussed, this erase command can be a security or sanitize block erase operation, as directed by the controller 115. At operation 420, the processing logic attempts to erase, in response to receipt of the erase command, a block of the multiple of blocks from the memory array. If the erase of the block is complete, the local media controller 130 can report a success code to the controller 115 to indicate successful erase of the block. If, however, the erase of the block is incomplete, the local media controller 130 can detect and report an error to the controller 115 such as with an error code or other indication that the erase operation failed. Accordingly, at operation 430, the processing logic can detect and report a failure to completely erase the block, e.g., by way of the error code. The failure to erase the block can extend to failure to completely erase additional blocks, but reference is made to the block to simplify the explanation.

At operation 440, the processing logic receives an update ROM command in response to the failure to erase the block. In one embodiment, the controller 115 sends the update ROM command to the local media controller 130, where the update ROM command can contain an indication of which block mapping to reprogram and how, as will be described. At operation 450, in response to the update ROM command, the processing logic updates programming of the ROM block to replace mapping information to the block, which makes the block inaccessible, e.g., to the local media controller 130 and therefore also to the controller 115 (or other coupled device attempting access over the ONFI 125). For example, in one embodiment, the mapping information is updated to remap the logical address instead to a spare empty block. In another embodiment, the mapping information is replaced with a fixed data pattern within a field of the ROM associated with the block, where the fixed data pattern is to indicate non-access to the block (see Table 1 and associated description). Any future access attempt to the block can therefore be blocked by reference to the mapping information in the ROM and an error code as to the inaccessibility of the block can be sent to the controller 115 by the local media controller 130.

Figure 5:
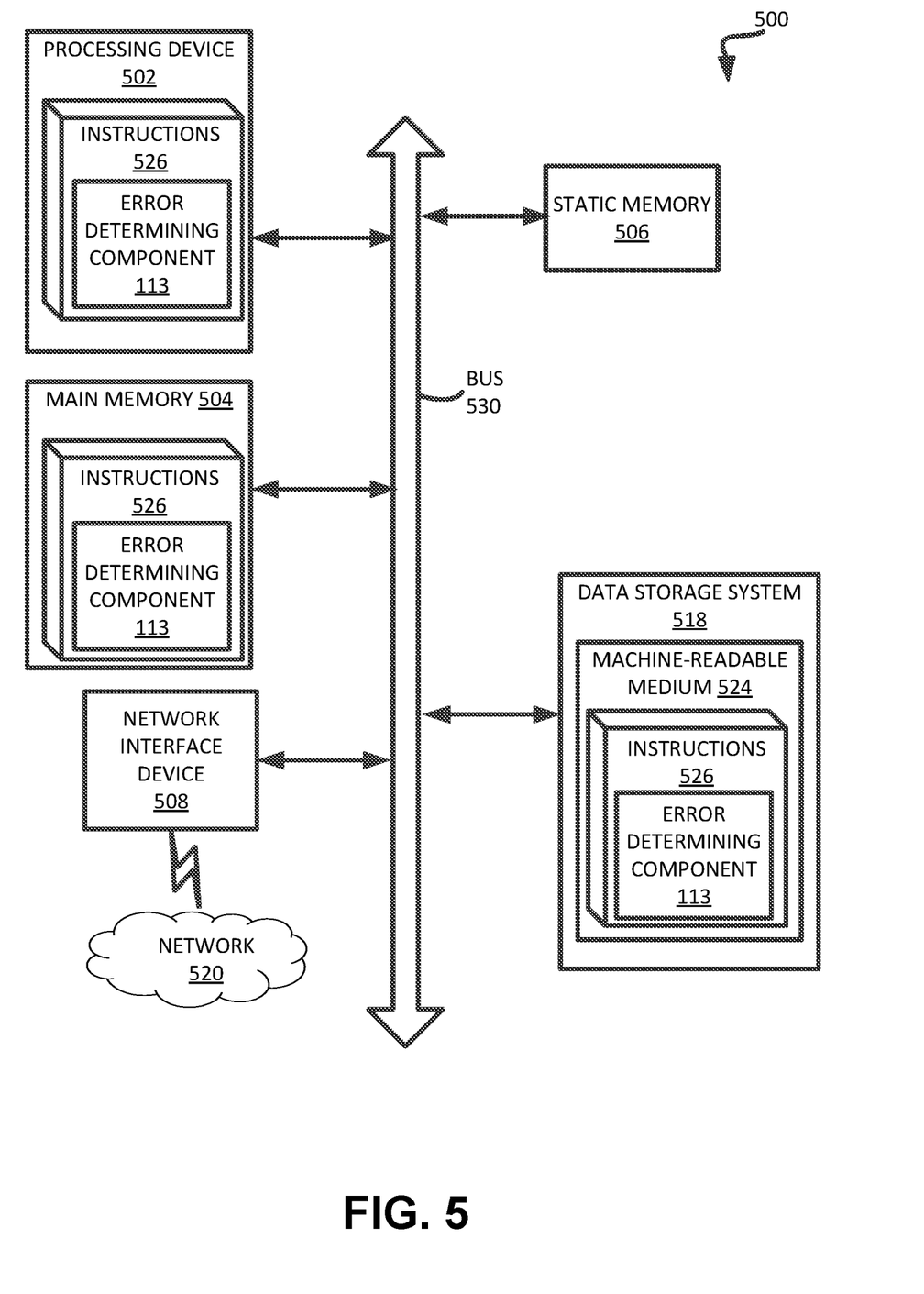
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIGS. 1A-1B) or can be used to perform the operations of a controller 115 (e.g., to execute an operating system to perform operations corresponding to the error determining component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIGS. 1A-1B.

In one embodiment, the instructions 526 include instructions to implement functionality corresponding to an error determining component (e.g., the error determining component 113 of FIG. 1A) or firmware of the local media controller 130. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory component comprising:
   a plurality of fuses;
   a memory array comprising a plurality of blocks; and
   control logic, operatively coupled with the memory array and the plurality of fuses, to:
   receive an erase command associated with the memory array;
   attempt to erase, in response to receipt of the erase command, a block of the plurality of blocks from the memory array;
   detect a failure to completely erase the block;
   receive a blow fuse command in response to the failure to completely erase the block; and
   blow a fuse, of the plurality of fuses, coupled with the block, to make the block electrically inaccessible to the control logic in response to receipt of the blow fuse command.

2. The memory component of claim 1, wherein the plurality of blocks each comprises one or more NAND memory cell.

3. The memory component of claim 1, further comprising an open NAND flash interface (ONFI) coupled between a processing device and the control logic, wherein the control logic comprises a hardware state machine that translates commands from the ONFI to accesses of the memory array, and wherein the fuse that is blown makes the block electrically inaccessible over the ONFI.

4. The memory component of claim 1, wherein respective fuses of the plurality of fuses are operatively coupled between respective blocks of the plurality of blocks and the control logic, and wherein to blow the fuse is to electrically disconnect the block from the control logic.

5. The memory component of claim 1, wherein the control logic is further to:
   receive, from a processing device, a read request directed at the block;
   detect that the fuse has been blown; and
   return a read error to the processing device in lieu of any data stored in the block.

6. A memory component comprising:
   a memory array comprising a plurality of blocks;
   a read-only memory (ROM) block storing a logical-to-physical address mapping of the plurality of blocks of the memory array; and
   control logic operatively coupled with the memory array and the ROM block, the control logic to:
   receive an erase command associated with the memory array;
   attempt to erase, in response to receipt of the erase command, a block of the plurality of blocks from the memory array;
   detect a failure to completely erase the block;
   receive an update ROM command in response to the failure to completely erase the block; and
   update programming of the ROM block to replace mapping information to the block, which makes a physical address of the block inaccessible to the control logic.

7. The memory component of claim 6, wherein to replace the mapping information to the block is to remap the block to a spare empty block of the plurality of blocks.

8. The memory component of claim 6, further comprising an open NAND flash interface (ONFI) coupled between a processing device and the control logic, wherein the control logic comprises a hardware state machine that translates commands from the ONFI to accesses of the memory array, and wherein to update programming of the ROM block makes the block inaccessible over the ONFI.

9. The memory component of claim 6, wherein the ROM block comprises a plurality of fields each corresponding to a respective block of the plurality of blocks, and wherein to update the programming of the ROM block, the control logic is to write a fixed data pattern to a first field, of the plurality of fields, corresponding to the block, wherein the fixed data pattern to indicate non-access to the block.

10. The memory component of claim 9, wherein the control logic is further to, in response to a request from the control logic to update the first field of the ROM block, reject the request and prevent further updates to the first field based on the fixed data pattern.

11. The memory component of claim 9, wherein a processing device, which is coupled to the control logic, is further to generate a hash-based message authentication code (HMAC) in association with an error code for the block, and wherein the control logic is further to store the HMAC in the first field of the ROM as the fixed data pattern.

12. The memory component of claim 9, wherein the control logic is further to:
receive, from a processing device, a read request directed at the block;
detect that the fixed data pattern is stored in the first field of the plurality of fields of the ROM block; and
return a read error to the processing device in lieu of any data stored in the block.

13. A method comprising:
receiving, by a control logic of a memory component, an erase command to erase at least a portion of the memory component comprising a memory array having a plurality of blocks;
attempting, by the control logic, to erase a block of the plurality of blocks in response to receipt of the erase command;
detecting, by the control logic, a failure to completely erase the block;
receiving, by the control logic in response to the failure to completely erase the block, a blow fuse command to make the block inaccessible over a data interface that couples a processing device to the control logic; and
blowing a fuse, of a plurality of fuses coupled with the block, to make the block electrically inaccessible to the control logic in response to receipt of the blow fuse command.

14. The method of claim 13, wherein respective fuses of the plurality of fuses are operatively coupled between respective blocks of the plurality of blocks and the control logic, and wherein blowing the fuse comprises electrically disconnecting the block of the plurality of blocks from the control logic.

15. The method of claim 13, further comprising:
receiving, from the processing device, a read request directed at the block;
detecting that the fuse has been blown; and
returning, to the processing device, a read error in lieu of any data stored in the block.

16. A method comprising:
receiving, by a control logic of a memory component, an erase command to erase at least a portion of the memory component comprising a memory array having a plurality of blocks;
attempting, by the control logic, to erase a block of the plurality of blocks in response to receipt of the erase command;
detecting, by the control logic, a failure to completely erase the block;
receiving, by the control logic in response to the failure to completely erase the block, an update read-only memory (ROM) command in response to the failure to completely erase the block; and
updating, by the control logic, programming of a ROM block stored on the memory component and that comprises a logical-to-physical address mapping of the plurality of blocks of the memory array, wherein updating comprises replacing mapping information to the block that makes a physical address of the block inaccessible to the control logic.

17. The method of claim 16, wherein the ROM block comprises a plurality of fields each corresponding to a respective block of the plurality of blocks, and wherein updating the programming of the ROM block comprises writing a fixed data pattern to a first field, of the plurality of fields, corresponding to the block, wherein the fixed data pattern to indicate non-access to the block.

18. The method of claim 17, wherein the method further comprises, in response to a request to update the first field, rejecting the request and preventing further updates to the first field based on the fixed data pattern.

19. The method of claim 17, further comprising:
receiving, from a processing device coupled with the memory component, a read request directed at the block;
detecting that the fixed data pattern is stored in the first field of the plurality of fields of the ROM block; and
returning, to the processing device, a read error in lieu of any data stored in the block.

* * * * *